(12) United States Patent
Wojcik

(10) Patent No.: US 7,079,027 B2
(45) Date of Patent: Jul. 18, 2006

(54) MOTION DETECTOR AND ILLUMINATION APPARATUS AND METHOD

(76) Inventor: Jamie Wojcik, 167 Farrington St., St. Paul, MN (US) 55102

( * ) Notice: Subject to any disclaimer, the term of this patent is extended or adjusted under 35 U.S.C. 154(b) by 38 days.

(21) Appl. No.: 10/821,339

(22) Filed: Apr. 9, 2004

(65) Prior Publication Data

US 2005/0237208 A1    Oct. 27, 2005

(51) Int. Cl.
*G08B 1/08* (2006.01)
*H04Q 7/00* (2006.01)
(52) U.S. Cl. ............ 340/539.26; 340/540; 340/541; 340/545.3; 340/555; 340/573.2
(58) Field of Classification Search ............... None
See application file for complete search history.

(56) References Cited

U.S. PATENT DOCUMENTS

| | | | | |
|---|---|---|---|---|
| 5,307,053 A | * | 4/1994 | Wills et al. ............ 340/573.1 |
| 5,440,292 A | * | 8/1995 | Bedrosian ............... 340/567 |
| 5,450,060 A | * | 9/1995 | Parkhurst ............ 340/539.26 |
| 5,463,595 A | * | 10/1995 | Rodhall et al. ............ 367/93 |
| 5,555,454 A | * | 9/1996 | Dees ............... 340/332 |
| 5,785,243 A | * | 7/1998 | Cross ................ 236/47 |
| 5,939,987 A | * | 8/1999 | Cram ................. 340/573.2 |
| 6,356,192 B1 | | 3/2002 | Menard et al. |
| 6,359,564 B1 | * | 3/2002 | Thacker ............ 340/573.1 |
| 6,903,655 B1 | * | 6/2005 | Stefanik ............ 340/571 |
| 2002/0173940 A1 | * | 11/2002 | Thacker et al. .......... 703/5 |
| 2003/0011471 A1 | | 1/2003 | Goings |
| 2003/0067385 A1 | | 4/2003 | Shank et al. |
| 2004/0246122 A1 | * | 12/2004 | Bailey, III ............ 340/506 |

* cited by examiner

*Primary Examiner*—Benjamin C. Lee
*Assistant Examiner*—Son Tang
(74) *Attorney, Agent, or Firm*—Patterson, Thuente, Skaar & Christensen, P.A.

(57) ABSTRACT

An apparatus for detecting motion and providing illumination is disclosed. The apparatus includes at least one motion detector and a receiver unit that communicate wirelessly. The apparatus is suited for outdoor applications, for example for use by hunters in monitoring a limited area surrounding a hunting stand in a wooded area. The motion detectors can be mounted on trees or other objects surrounding a hunting stand and the receiver can be mounted on the hunting stand. The receiver includes at least one indicator to alert a hunter when motion has been detected by one of the motion detectors. The receiver also includes at least one light source for illuminating the hunting stand and the area surrounding the hunting stand to aid a hunter in locating and safely settling in the stand.

19 Claims, 4 Drawing Sheets

MOTION DETECTOR AND ILLUMINATION APPARATUS AND METHOD

FIELD OF THE INVENTION

The present invention relates generally to motion detection. The present invention relates more particularly to an apparatus and method for detecting motion that includes a light source that can be remotely and selectively triggered.

BACKGROUND OF THE INVENTION

Hunting is a sport that requires skill and patience. For example, deer hunters typically track animals on foot or wait in stands for animals to approach. Hunting stands are frequently installed on trees in wooded areas, or built as freestanding structures in fields and other open areas, and are generally accessible by some form of ladder.

Because wildlife is usually most active early in the day and again in the evening, hunters prefer to be settled in their stands by the time the sun is rising in the morning and stay in their stands until after sunset. Particularly in wooded areas, it can be difficult to quickly locate a stand on a tree, climb up into the stand while carrying a firearm and other equipment, and get settled when there is low or no light. Further, it is advantageous for a hunter to remain as quiet as possible in order to not disturb or drive away any wildlife in the area.

While it can be logistically difficult for a hunter to get settled in a stand, a more important consideration is safety. A hunter trying to climb into a tree stand while carrying a firearm and other equipment, for example ammunition, food and water, and binoculars, and using a flashlight to illuminate the area could damage equipment, fall from the stand, or drop the firearm. The danger is exacerbated in many popular hunting areas in cold weather climates, where bulky clothing and inclement weather conditions such as rain, snow, ice, and freezing temperatures further hamper a hunter's safe climb into a stand.

Once a hunter is settled into a stand, he or she must wait patiently for a deer to come by, watching for signs of movement among the trees. It can be difficult for a hunter to monitor the entire area surrounding the stand for subtle signs of movement indicating the presence of an animal. Caution must also be used because movement that a hunter might believe is wildlife could in fact be another hunter or person or a domesticated animal.

Systems have therefore been developed to aid hunters in detecting motion that might indicate the presence of wildlife. For example, U.S. Pat. No. 5,450,060 discloses a system with one or more sensors that detect motion within a given area, and at least one remote receiver that notifies a hunter or outdoorsman that motion has been detected. The remote receiver can be a receiver with visual (i.e., LEDs) or audible (i.e., beeping tone in an earphone), or both, to alert the hunter outdoorsman that one or more of the sensors has been activated by motion within its range.

Other systems for detecting motion are also generally known, although not specifically adapted for hunting applications. U.S. Patent Application Publication No. 2003/0067385 discloses a motion sensor system that has several sensor units. Each sensor unit is freely movable, easily hidden, and includes a motion sensor and a wireless radio frequency (RF) transmitter. The motion sensor system further includes a receiver unit, which includes a wireless radio frequency receiver and a device for communicating receipt of a signal to the user. When at least one of the motion sensors of at least one of the sensor units detects motion, the wireless radio frequency transmitter transmits a signal to the radio frequency receiver of the receiver unit. The receiver unit then communicates receipt of the signal to the user.

U.S. Pat. No. 6,356,192 discloses a bi-directional wireless detection system that detects at least one event of interests and comprises a detector, a programmable controller, and a network. U.S. Patent Application Publication No. 2003/0011471 discloses a motion sensing apparatus having a control module and a slave module.

While these and other systems are capable of detecting motion and communicating the same to a user, these systems do not address the safety issues described above with respect to the ability of a hunter to locate a stand in little or no light. They further do not aid a hunter in ascending a tree, getting into the stand with a firearm and other equipment, and getting settled safely.

Therefore, there is currently a need for a system to aid a hunter in monitoring a geographical area and detecting motion in the area. There is also a need for such a system to aid a hunter is locating and safely ascending a hunting stand when there is little or no light.

SUMMARY OF THE INVENTION

The present invention substantially addresses the above described needs by providing a motion detection apparatus and method. The present invention further provides an integrated illumination apparatus and method.

In one preferred embodiment, the apparatus of the present invention comprises at least one motion detector, a remote transmitter, and a receiver. The at least one motion detector comprises a transmitter operable to wirelessly transmit at least one motion signal to the receiver after detecting motion. The remote transmitter is operable to selectively wirelessly transmit an activation signal to the receiver to trigger a receiver-mounted light source. The receiver preferably comprises a microcontroller and a sensor in electrical communication with the microcontroller and in wireless communication with the transmitter and the remote transmitter to receive the at least one motion signal and the activation signal. The receiver further comprises at least one indicator in electrical communication with the microcontroller and respectively associated with the at least one motion detector, wherein the at least one indicator is activated upon receipt by the receiver of the at least one motion signal. The receiver also includes at least one light source that can be selectively activated by the activation signal transmitted by the remote transmitter.

The present invention is also directed to a method of using a motion detection and illumination system substantially as described herein during hunting. In one preferred embodiment, the method comprises the steps of mounting at least one motion detector and a receiver in a geographical area such that the at least one motion detector and the receiver are in wireless communication, wherein the receiver comprises at least one light source and at least one motion indicator; approaching the receiver and selectively activating the at least one light source using a remote wireless signal transmitter to illuminate the area proximate the receiver and assist in locating an exact location of the receiver; monitoring the at least one motion indicator on the receiver for an indication that motion has been detected by the at least one motion detector; and selectively activating the at least one light source using a remote wireless signal transmitter to illuminate the area proximate the receiver and assist in leaving the area proximate the receiver. The method can further comprise the step of selectively deactivating the light source using the remote wireless signal transmitter.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
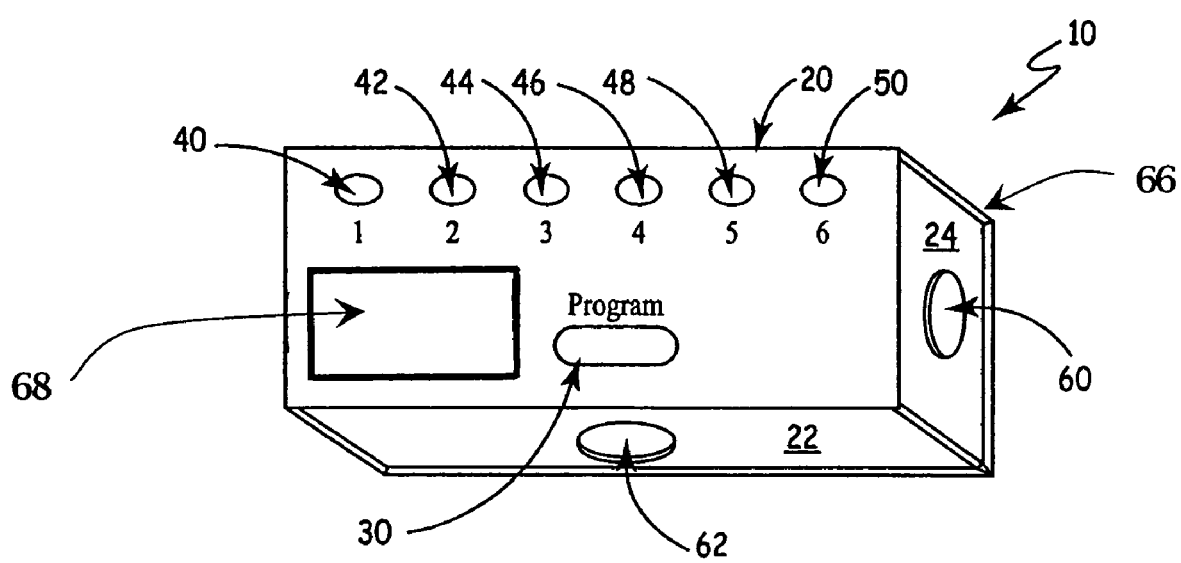
FIG. 1 is a perspective view of a receiver in accordance with one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The apparatus and method of the present invention assist in detecting motion in a geographical area, providing feedback indicating motion has been detected, and providing a source of illumination to aid during times of the day when there is little or no natural light. The present invention can be more readily understood by reference to FIGS. 1–4 and the following description. While the present invention is not necessarily limited to such an application, the invention will be better appreciated using a discussion of exemplary embodiments in specific contexts.

The present invention generally comprises an integrated motion detection and illumination apparatus. The motion detection apparatus includes at least one wireless motion detector that wirelessly transmits data in a motion signal to a main receiver when motion is detected. The main receiver provides feedback to a user indicating that motion has been detected by the at least one motion detector. The main receiver further includes an illumination system comprising a plurality of light sources integrated into the exterior of the main receiver. The light sources can be remotely activated in order to illuminate a particular area on demand.

Referring to FIG. 1, the main receiver 10 comprises a housing 20, a wireless transmission sensor 30, at least one indicator 40–50, and at least one light source 60, 62 in one embodiment. The housing 20 is preferably weatherproof and comprises a durable material, for example metal or a heavy duty plastic. In one embodiment, the housing 20 further comprises mounting means for removably mounting the receiver 10 to a static object, for example a hunting stand (refer to FIG. 3).

The receiver 10 depicted in FIG. 1 includes two external light sources 60, 62, one (62) on a bottom surface 22 and one (60) on a first side surface 24. It will be appreciated by those skilled in the art that the quantity and position of the light sources can vary without departing from the spirit or scope of the invention. The light sources 60, 62 preferably comprise light emitting diodes (LEDs) or other low power illumination sources that provide the desired level of illumination for a particular area or application.

Figure 3:
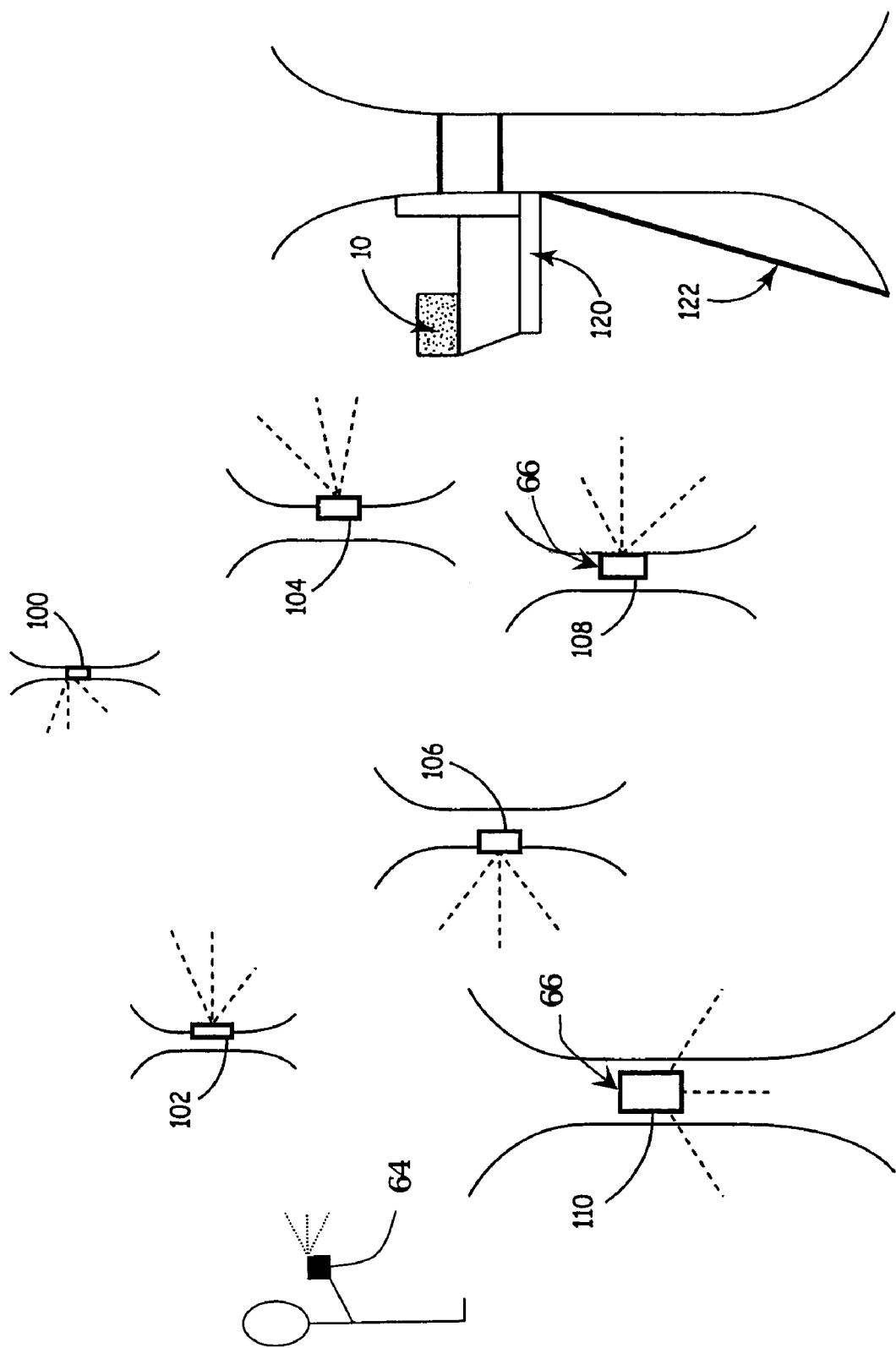
FIG. 3 is perspective view of an implementation of one embodiment of the system of the present invention in an exemplary hunting area.

In one embodiment, the apparatus of the present invention further comprises a remote signal transmitter 64 (refer to FIG. 3), for example a keychain transmitter similar to those used to remotely lock and unlock automobiles. The remote signal transmitter 64 selectively and wirelessly transmits an activation signal to the receiver 10 to activate the light sources 60, 62. The receiver 10 is preferably mounted on a hunting stand or along a path to a stand to aid a hunter in locating or ascending a stand. In the preferred embodiment of FIG. 1, for example, the receiver 10 could be mounted on a railing of a hunting stand with light source 60 directed toward an approach path. Upon activating the light sources 60, 62 via a remote signal transmitter 64 as described above, light source 60 would illuminate the path leading up to the tree stand while light source 62 would illuminate the ladder into the tree stand. Refer also to FIG. 3. In one preferred embodiment, the light sources 60, 62 can be deactivated via the remote signal transmitter 64 or are deactivated automatically after some length of time has passed.

Figure 4:
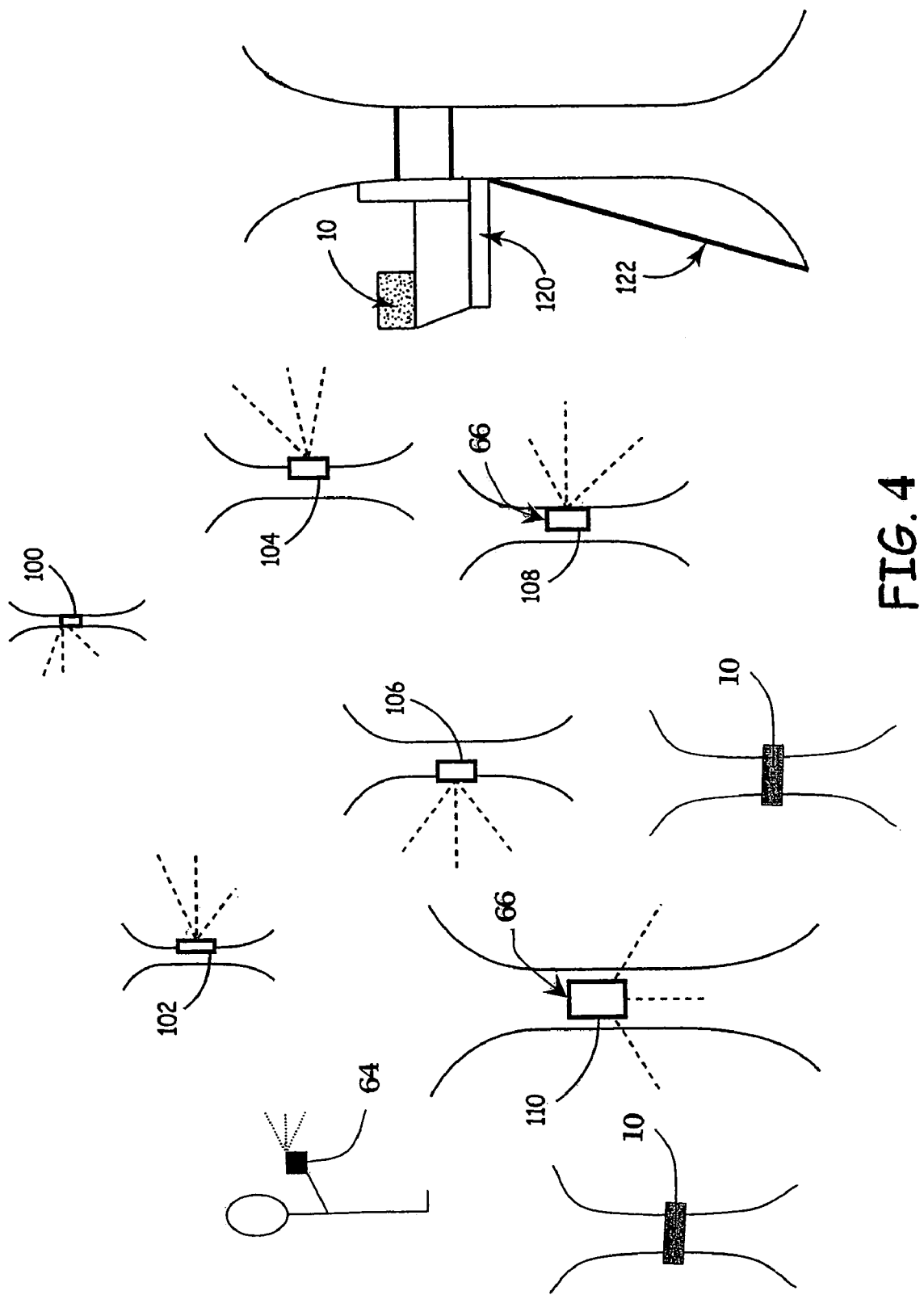
FIG. 4 is a perspective view of an implementation of another embodiment of the system of the present invention in an exemplary hunting area.

Referring to FIG. 4, in another preferred embodiment, a plurality of receiver units 10 in electrical communication are mounted along an extended portion of a path leading to a stand. Transmitting an activation signal to the first receiver 10 using the remote signal transmitter 64 as described above to activate a light source 60, 62 would relay a command to subsequent receivers 10 to activate subsequent light sources 60, 62, lighting an entire path to a stand. In yet another preferred embodiment, the light sources 60, 62 are activated by a dedicated motion sensor along the path or mounted near the tree stand.

The wireless transmission sensor 30 is positioned on the exterior of the case 20 so as to best sense and receive wireless communications from the remote signal transmitter 64 and the at least one motion detector distributed in a relatively proximate geographical area. It will be appreciated by those having skill in the art that various wireless detectors and receivers, including commercially available wireless motion detectors and receivers and those that are custom designed, may be incorporated into the apparatus of the present invention without departing from the spirit or scope thereof. Therefore, the size of the geographical area in which the apparatus is used and the orientation of the various components described herein within that area can vary in preferred embodiments according to the particular specifications of the devices. Examples of commercially available motion detectors include the HAWKEYE MOTION SENSOR or EAGLEEYE MOTION SENSOR available from X10.

Figure 2:
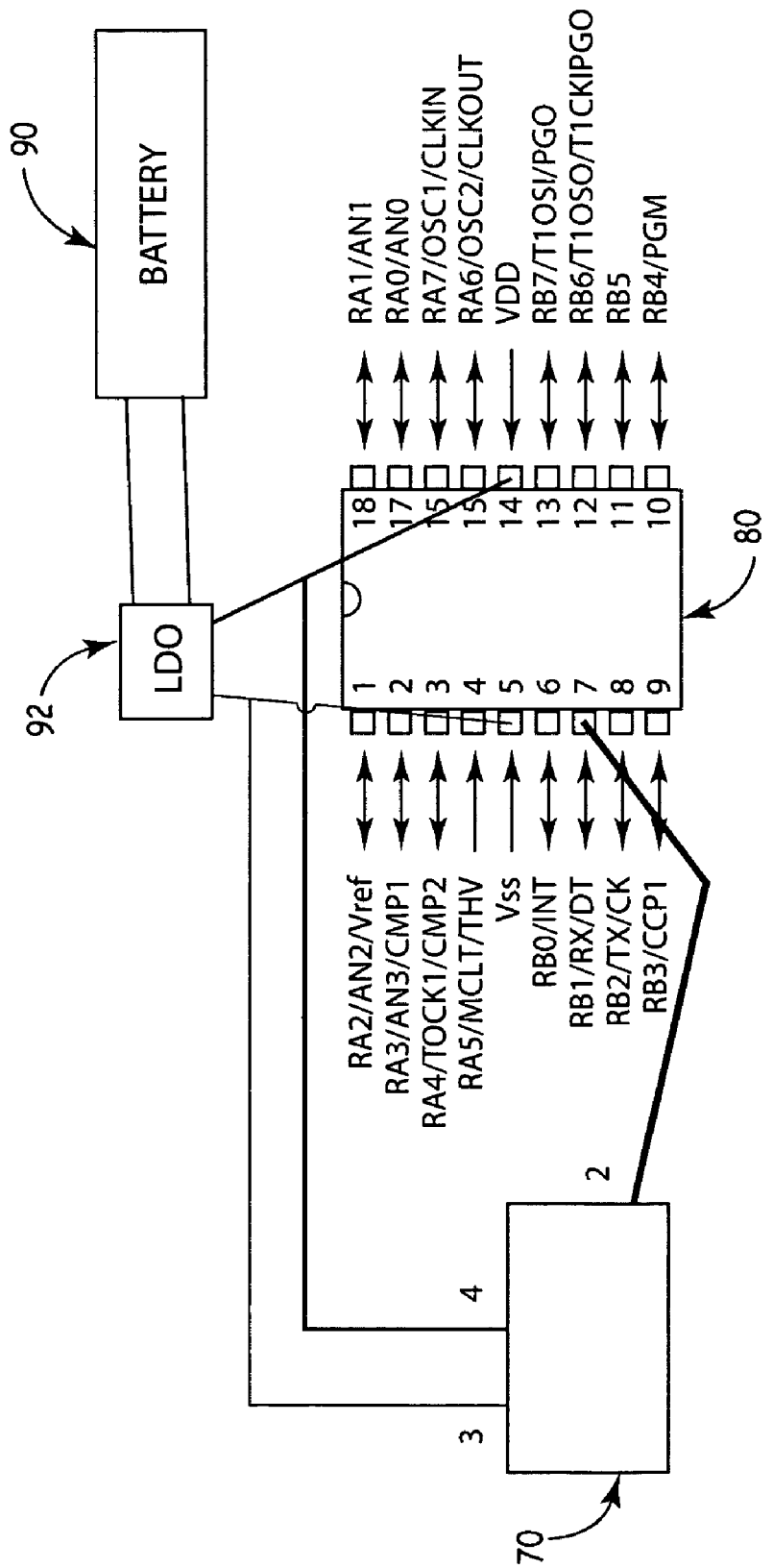
FIG. 2 is a schematic diagram of a microcontroller in accordance with one embodiment of the present invention.

Referring to FIGS. 1 and 2, the sensor 30 is in electrical communication with an internal receiver unit 70 that receives the sensed signals and communicates the signals to an internal microcontroller 80. The microcontroller 80 is in electrical communication with and controls the indicators 40–50 on the receiver 10. In one preferred embodiment, the indicators 40–50 are LEDs. The indicators 40–50 can comprise a single color or can include multiple colors; for example, a first color could indicate motion has been detected and a second color could indicate that the motion has stopped or that some amount of time has passed since the motion was first detected. In another preferred embodiment including LED indicators 40–50, the indicators 40–50 are lit with full intensity when motion is detected, dim after some amount of time has passed since motion was last detected, and turn off after additional time has passed if no additional motion has been detected.

For ease of portability, internal power is supplied to the receiver unit 70 and microcontroller 80 from a battery 90 via a power regulator 92. The at least one motion detector is also preferably battery powered. In one embodiment, the receiver 10 and detectors further comprise solar panels 66 to power the devices or recharge the batteries.

The indicators 40–50 can display additional information that may be of use to a hunter. In one embodiment, the receiver 10 further comprises a temperature sensor, and the indicators 40–50 would provide temperature information by lighting up in a particular pattern. In other embodiments, the receiver 10 further comprises a liquid crystal display (LCD) 68 screen for displaying the temperature or other information. The LCD screen 68 could also display the current date and time, sunrise and sunset times, or a history of recorded motion events detected by the plurality of detectors, in addition to other information desired by a hunter that the microcontroller 80 of the receiver 10 has been programmed to calculate, accumulate, or report.

Referring to FIGS. 1 and 3, a receiver 10 and a plurality of wireless motion detectors 100–110 are mounted on trees in a geographic area. The receiver 10 is mounted on a tree stand 120 such that a light source 60, 62 disposed on an external surface of the receiver 10 illuminates at least an area surrounding a ladder 122 leading to the stand 120. The motion detectors 100–110 can comprise custom wireless motion sensors or compatible commercially available wireless motion detectors and are operable to wirelessly detect motion and transmit motion signals to the receiver 10. The motion detectors 100–110 are distributed within range of the receiver 10 to maximize the area within which motion is detected and each of the motion detectors 100–110 is set to a different code so as to be recognized by the receiver 10 and associated with an indicator 40–50. For example, motion detected by motion detector 100 would be reported via indicator 40, motion detected by motion detector 102 would be reported via indicator 42, and so on.

In use, a hunter who had previously installed the system similarly to that depicted in FIGS. 1–4 would approach the area of the stand 120 and selectively activate the light source(s) 60, 62 using a keychain-mounted remote signal transmitter 64 in order to locate the stand 120 and safely ascend the ladder 122. The hunter can then deactivate the light source(s) 60, 62 via the remote signal transmitter 64 or by waiting some length of time for the light source(s) 60, 62 to automatically deactivate.

When a particular motion detector 100–110 or a plurality of detectors 100–110, for example detector 102, has detected motion, the motion detector 102 transmits its address to the receiver 10 in a motion signal. The sensor 30 detects the motion signal and communicates the motion signal to the receiving unit 70 and subsequently the microcontroller 80. The microcontroller 80 associates the motion signal with a particular motion detector 102, matches the motion detector 102 to an indicator 42, and indicates the detected motion reported from motion detector 102 by turning on the associated indicator 42. The receiver 10 can receive motion signals from a plurality of motion detectors 100–110 simultaneously and indicate the reported motion by lighting each of the associated indicators 100–110.

Upon seeing the indicator 42 light up, the hunter can focus his or her attention on the area surrounding the identified motion detector 102 to ascertain the source of the detected motion, for example a fellow hunter or wildlife. Throughout a day spent in the hunting stand 120, the motion detectors 100–110 will detect motion and transmit motion signals to the receiver 10, and the receiver 10 will report the motion via the indicators 40–50. When the hunter decides to leave for the day, he or she can again selectively activate the light source(s) 60, 62 in order to safely descend the ladder 122 and leave the area.

Because numerous modifications of this invention may be made without departing from the spirit thereof, the scope of the invention is not to be limited to the embodiments illustrated and described. Rather, the scope of the invention is to be determined by the appended claims and their equivalents.

The invention claimed is:

1. A motion detection and illumination apparatus comprising:
   at least one motion detector to detect motion in a hunting environment, the at least one motion detector comprising a transmitter operable to wirelessly transmit at least one motion signal after detecting motion;
   a remote signal transmitter operable to selectively wirelessly transmit an activation signal; and
   a receiver, the receiver comprising
      a microcontroller,
      a sensor in electrical communication with the microcontroller and in wireless communication with the transmitter and the remote signal transmitter to receive the at least one motion signal and the activation signal,
      at least one indicator in electrical communication with the microcontroller and respectively associated with the at least one motion detector and activated upon receipt of the at least one motion signal, and
      at least one locally directed light source selectively activated by the remotely wirelessly transmitted activation signal.

2. The apparatus of claim 1, wherein the receiver further comprises a weatherproof housing.

3. The apparatus of claim 2, wherein the housing is adapted to be removably mounted to a structure.

4. The apparatus of claim 1, wherein the at least one indicator is deactivated after a period of time after receipt of the at least one motion signal has passed.

5. The apparatus of claim 1, wherein the at least one indicator comprises a light emitting diode.

6. The apparatus of claim 5, wherein the at least one indicator is activated at a first level of brightness upon receipt of the at least one motion signal, at a second level of brightness after a first period of time has passed after receipt of the at least one motion signal, and is deactivated after a second period of time after receipt of the at least one motion signal has passed.

7. The apparatus of claim 5, wherein the at least one indicator is activated in a first color upon receipt of the at least one motion signal and is activated in a second color after a period of time has passed after receipt of the at least one motion signal.

8. The apparatus of claim 1, wherein the at least one light source comprises a light emitting diode.

9. The apparatus of claim 1, wherein the at least one light source is deactivated after a period of time after receipt of the activation signal has passed.

10. The apparatus of claim 1, wherein the at least one light source is deactivated after receipt of a second activation signal.

11. The apparatus of claim 1 further comprising a plurality of receivers in wireless communication.

12. The apparatus of claim 11, wherein a first receiver receiving an activation signal wirelessly relays the activation signal to at least a second receiver.

13. The apparatus of claim 1, wherein the receiver further comprises a liquid crystal display.

14. The apparatus of claim 13, wherein the receiver further comprises a temperature sensor, and wherein a sensed temperature is displayed on the display.

15. The apparatus of claim 1, wherein the receiver and the at least one motion detector are battery powered.

16. The apparatus of claim 1, wherein the receiver and the least one motion detector are solar powered.

17. A method of using a motion detection and illumination system during hunting comprising the steps of:
  mounting at least one motion detector and a receiver in a geographical area associated with hunting environment such that the at least one motion detector and the receiver are in wireless communication, wherein the receiver comprises at least one locally directed light source and at least one motion indicator;
  selectively activating the at least one locally directed light source by wirelessly transmitting an activation signal to illuminate the area proximate the receiver and assist in locating an exact location of the receiver;
  monitoring the at least one motion indicator on the receiver for an indication that motion has been detected by the at least one motion detector; and
  selectively activating the at least one light source using a remote signal transmitter to illuminate the area proximate the receiver and assist in leaving the area proximate the receiver.

18. The method of claim 17 further comprising the step of selectively deactivating the at least one light source after the receiver has been located.

19. A motion detection and illumination apparatus comprising:
  at least one means for detecting motion in at least one location in a hunting environment and wirelessly transmitting at least one motion signal after detecting motion;
  remote transmitter means for selectively wirelessly transmitting an activation signal; and
  a receiver, the receiver comprising a microcontroller, sensing means for receiving the at least one motion signal and the activation signal, at least one indicator means in electrical communication with the microcontroller and respectively associated with the at least one means for detecting motion, and at least one locally directed illumination means for illuminating an area proximate the receiver,
  wherein the at least one indicator means is activated upon receipt by the receiver of the at least one motion signal, and wherein the at least one illumination means is selectively activated by the activation signal transmitted by the remote transmitter means.

* * * * *